United States Patent
Persiani

(10) Patent No.: US 7,942,774 B2
(45) Date of Patent: May 17, 2011

(54) ELECTRICAL MOTOR REDUCER FOR OPERATING AN ECCENTRIC CAM

(75) Inventor: Luigi Persiani, Dronero (IT)

(73) Assignee: Dayco Europe S.r.l. con Unico Socio, Chieti (IT)

( * ) Notice: Subject to any disclaimer, the term of this patent is extended or adjusted under 35 U.S.C. 154(b) by 753 days.

(21) Appl. No.: 11/571,883

(22) PCT Filed: Jul. 8, 2005

(86) PCT No.: PCT/EP2005/053295
§ 371 (c)(1),
(2), (4) Date: Nov. 26, 2007

(87) PCT Pub. No.: WO2006/005737
PCT Pub. Date: Jan. 19, 2006

(65) Prior Publication Data
US 2008/0184832 A1  Aug. 7, 2008

(30) Foreign Application Priority Data

Jul. 9, 2004  (IT) .............................. MC2004A0092

(51) Int. Cl.
*F16H 3/72* (2006.01)
*F16H 48/06* (2006.01)

(52) U.S. Cl. .............................. 475/5; 475/149; 475/903

(58) Field of Classification Search .............. 475/5, 162, 475/163, 168, 149, 903; 180/372
See application file for complete search history.

(56) References Cited

U.S. PATENT DOCUMENTS

| | | | | | |
|---|---|---|---|---|---|
| 3,812,928 | A | * | 5/1974 | Rockwell et al. | 180/65.51 |
| 4,020,716 | A | * | 5/1977 | Toth et al. | 475/337 |
| 4,231,551 | A | * | 11/1980 | Ikeda | 254/344 |
| 4,670,679 | A | | 6/1987 | Koot et al. | |
| 5,156,579 | A | * | 10/1992 | Wakuta et al. | 475/161 |
| 5,434,695 | A | | 7/1995 | Saito et al. | |
| 6,099,432 | A | * | 8/2000 | Shirokoshi | 475/331 |
| 7,425,186 | B2 | * | 9/2008 | Lemberger | 476/48 |
| 7,621,835 | B2 | * | 11/2009 | Oshidari | 475/5 |
| 2004/0214680 | A1 | * | 10/2004 | Schoon | 475/149 |

FOREIGN PATENT DOCUMENTS

| | | |
|---|---|---|
| DE | 195 18 160 A1 | 4/1996 |
| DE | 101 01 608 A1 | 7/2002 |
| EP | 1 416 505 A | 5/2004 |
| JP | 58028045 A * | 2/1983 |
| JP | 04 331848 A | 11/1992 |
| JP | 04331848 A * | 11/1992 |

OTHER PUBLICATIONS

PCT International Search Report for PCT/EP2005/053295, mailed Oct. 21, 2005, 4 pages.
PCT Written Opinion for PCT/EP2005/053295, mailed Oct. 21, 2005, 6 pages.
PCT Notification of Transmittal of the International Preliminary Examination Report for PCT/EP2005/053295, mailed Oct. 21, 2005, 6 pages.

* cited by examiner

*Primary Examiner* — Roger Pang
(74) *Attorney, Agent, or Firm* — Blakely Sokoloff Taylor & Zafman LLP

(57) ABSTRACT

The present invention relates to a cam actuator which adopts an epicyclic reducer housed inside the eccentric cam supporting pivot, where is also provided a housing compartment for the electrical motor, whose pinion is perfectly coaxial with the axis of the epicyclic reducer and with the axis of said supporting pivot.

12 Claims, 2 Drawing Sheets

ELECTRICAL MOTOR REDUCER FOR OPERATING AN ECCENTRIC CAM

CROSS-REFERENCE. TO OTHER APPLICATIONS

This is a National Phase of International Application No. PCT/EP2005/053295, filed on Jul. 8, 2005, which claims priority from Italian Patent Application No. MC2004A000092, filed on Jul. 9, 2004.

TECHNICAL FIELD

The present invention relates to an electrical motor reducer for operating an eccentric cam.

Document JP 04-331 848 discloses a reducer comprising an electrical motor connected to an epicyclic gearing. However, such reducer does not operate an eccentric cam.

DISCLOSURE OF INVENTION

The object of the present invention is to design a cam actuator comprising a small sized electrical motor reducer with a high reduction ratio, which is easy and fast to assemble.

A further object of the invention is to design a motor reducer having the foregoing features, with high reliability and capable of working in either direction of rotation, so as to be used either to operate unidirectionally rotatable cams or to operate cams pivoting between two positions, namely one idle and one working position.

Another object of the invention is to design an electrical motor reducer with the aforementioned peculiarities, which could be capable of a low operation output and high mechanical efficiency thanks to extremely precise coupling and a perfect centring among electrical motor, motor reducer and eccentric cam supporting pin.

All these objects are jointly achieved by the cam actuator according to the invention as claimed.

For a better explanatory clarity, the description of the motor reducer of the present invention will now continue with reference to the accompanying drawings, given only by way of non-limitative example, in which it is envisaged that the aforesaid eccentric cam is used in connection with a crank mechanism for transforming a circular motion into a reciprocating motion.

BEST MODE FOR CARRYING OUT THE INVENTION

Figure 1:
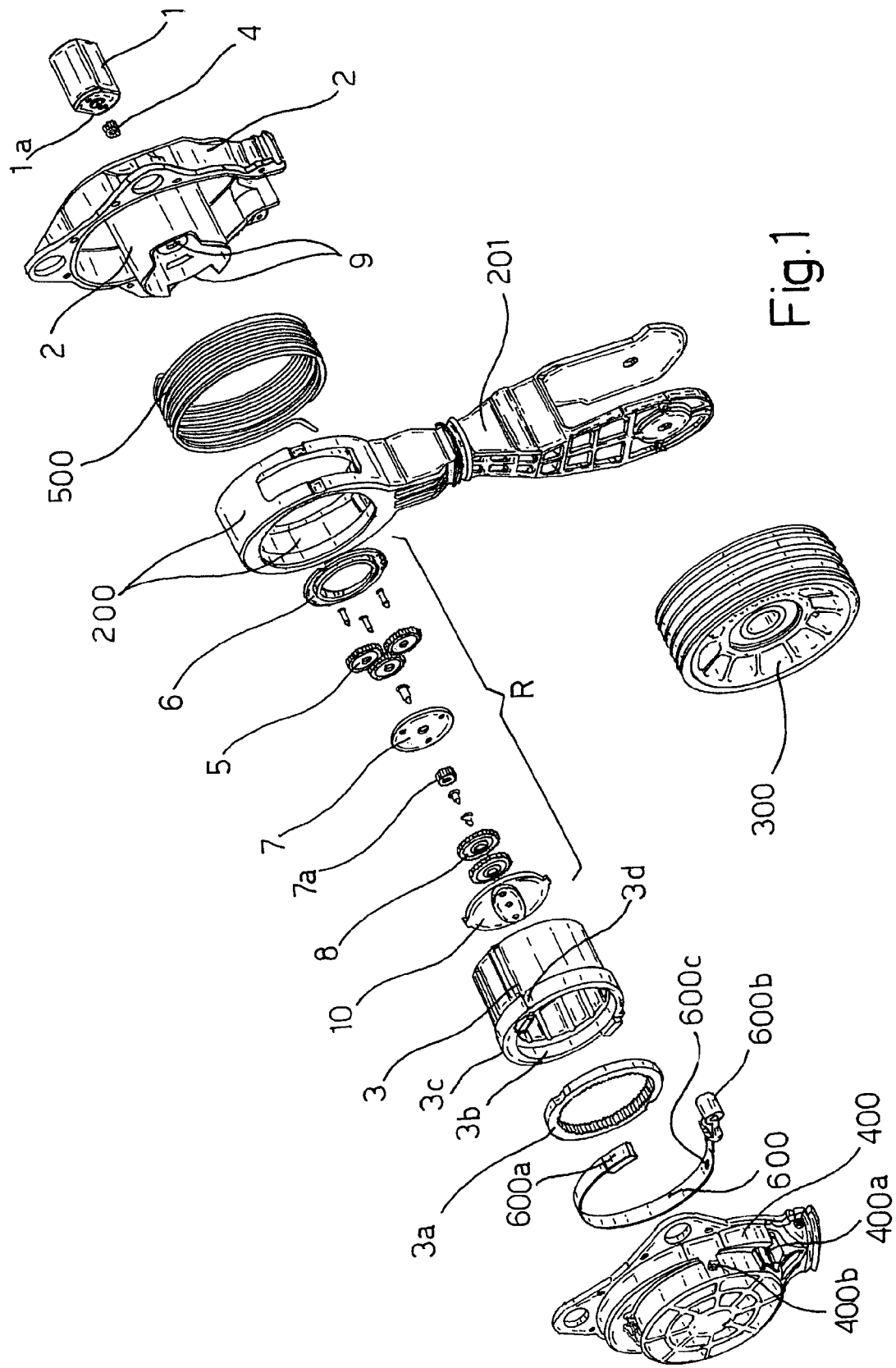
FIG. 1 is an exploded, perspective drawing showing an electrical motor reducer according to the invention and the respective eccentric cam.

With reference to the aforesaid figures, in brief, the motor reducer comprises an electrical motor (1) and an epicyclic reducer (R) housed within a cylindrical casing that serves as supporting pin (2) of an eccentric cam (3).

A pinion (4) of the motor (1) meshes with three planetary gears (5) of the epicyclic reducer (R) which all mesh with a common internal-toothing ring gear (6) fastened inside the pin (2), so that a planetary carrier (7) is forced to rotate in the opposite direction to that of the planetary gears (5) supported by said planetary carrier (7).

A central pinion (7a) of the planetary carrier (7) meshes with a pair of opposed idle gears (8), which rotatably drive the cam (3) that has the structure of a collar exactly fitted on the outside of the supporting pin (2).

On the internal rim of said collar, it is provided an internal-toothing ring gear (3a), which is rotatably driven by said pair of idle gears (8), whose teeth can mesh with those of the gear ring (3a) thanks to the provision of a pair opposed of slots (9) on the cylindrical wall of the hollow pin (2).

Figure 2:
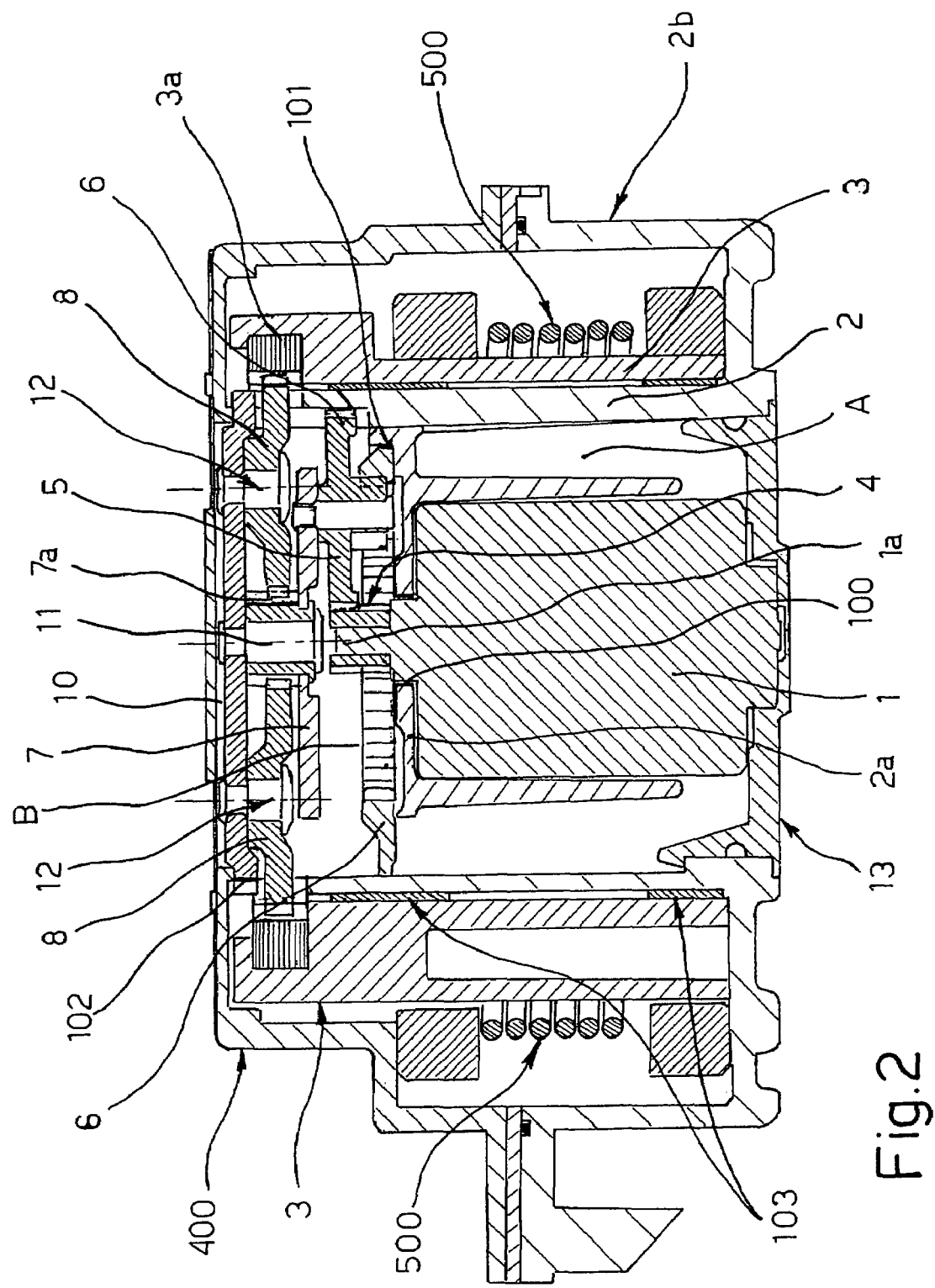
FIG. 2 is a cross-section of the motor reducer taken along an axial plane, assembled within the eccentric cam supporting pin.

As shown in FIG. 2, the pin (2) internally carries two housing compartments (A and B) superimposed to one another and separated by a transversal partition (2a), on which a hole is provided for the passage of the shaft (1a) of, the motor (1), which is housed in the lower compartment (A) while the epicyclic reducer (R) is housed within the upper compartment (B).

The great ease and high accuracy of the assembly of the motor reducer according to the invention consists in that the pin (2) serves as a reference centring for the motor shaft (1), for the fixed ring gear (6) of the epicyclic reducer (R) and for a closing cover plate (10) on which a supporting pin (11) of the pinion (7a) and the opposed pair of pins (12) supporting the opposed pair of idle wheels (8) are provided.

With regard to this, attention is drawn to the fact that on the pin (2) all the circular seats on whose perfect concentricity depends the effective operation of the entire mechanism are machined during the same turning process.

More precisely, the following seats are provided inside the pin (2):

the centring seat (100) of the motor shaft (1a)
the centring seat (101) of the fixed ring gear (6)
the centring seat (102) of the closing cover plate (10).

The cylindrical centring surface (103) of the cam (3) is also made inside the pin (2).

The fact that these circular surfaces are machined during the same turning phase of the pin (2) ensures a perfect reciprocal concentricity and consequently a perfect coupling between all the gears, thus allowing even to assemble the motor (1) separately from the epicyclic reducer (R).

In fact, the motor (1) is inserted and centred in the lower compartment (A), where it is closed by means of a lid (13), while the epicyclic reducer (R) is fitted in the upper compartment (B), where it is closed by the aforesaid cover plate (10).

The perfect coaxiality between the motor (1) and the epicyclic reducer (R) ensures a perfect meshing between the pinion (4) keyed on the motor shaft (1a) and the three planetary gear (5); likewise, the perfect coaxiality between the cover plate (10) and the epicyclic reducer (R) ensures a perfect meshing between the pinion (7a) and the pair of opposed idle gears (8), and, finally, the perfect coaxiality between the cover plate (10) and the external surface (103) of the pin (2) ensures a perfect meshing between the pair of opposed idle gears (8) and internal-toothing ring gear (3a).

As previously mentioned, in the attached figures, it is envisaged that the aforesaid eccentric cam (3) is used in connection with a crank mechanism for transforming a circular motion into a reciprocating straight motion and that said cam (3) oscillates between two limit stop positions, i.e. one idle and one working position, the first reached by effect of the drive of the motor (1) and the other by effect of the return force exerted on the cam (3) by a spring (500).

The solution in which a return spring (500) is adopted instead of reversing the rotation direction of the motor (1)

ensures that the working position is always reached, also in the event of a failure of the electrical motor (1).

In this particular type of application, the cam (3) is inserted in the eye (200) of a connecting rod (201) which supports on its other end a pulley (300) to which a reciprocating motion must be conferred to reach an advanced working position and a retracted idle position.

In this embodiment, it is also provided that the pin (2) incorporates a circular boot (2b) adapted to cooperate with a counter-boot (400) to enclose and encompass the eye (200) of the connecting rod (201).

Particularly, said counter-boot (400) surrounds the rim (3b) of said cam (3) on the outside of which an enlarged edge (3c) is provided, which forms a tooth (3d) on which there is fastened the hooked end (600a) of a strap (600) whose other end is provided with a handle (600b).

In practice, the strap (600) is housed within said counter boot (400) and said handle (600b) extends outside a slot (400a) of the counter-boot (400). The strap (600) can be useful during assembly, disassembly or maintenance operations of the apparatus in which said crank mechanism works, whenever it is convenient to stop the pulley (300) in the idle position without using the motor drive (1).

In such circumstances, it will suffice to grasp the handle (600b) and pull the strap (600) to drive the cam (3) against the resistance offered by the return spring (500).

To temporarily stop the strap (600) in maximum extracted position, a lock pin (601) is simply inserted within a special hole (600c) made in the belt itself and within a special hole (400b) made in the counter-boot (400).

Otherwise, lock pin (601) can be rigidly connected on the counter-boot (400), which therefore does not define the special hole (400b) any more.

What is claimed is:

1. A cam actuator, comprising:
   a motor,
   an epicyclic reducer driven by said motor,
   a pivot having a hollow structure and housing said motor and said epicyclic reducer, and
   an eccentric cam comprising a collar inserted on and freely rotatable about said pivot and driven by said epicyclic reducer, wherein the pivot defines a sliding centering surface to guide the rotation of the cam, and wherein the centering surface is radially interposed between the motor and the cam.

2. The cam actuator as claimed in claim 1, wherein said epicyclic reducer includes a fixed internal-toothing ring gear, a planetary gear carrier having a pinion and carrying a plurality of planetary gears meshing with said internal-toothing ring gear, and at least one idle gear meshing centrally with said pinion and peripherally with an internal-toothing ring gear fixed to said eccentric cam; and wherein said pivot serves as a reference centring for a shaft of the motor, for the fixed internal-toothing ring gear of the epicyclic reducer and for a cover plate, which closes a compartment housing the reducer and carries supporting pins for the pinion of the planetary gear carrier and for said at least one idle gear.

3. The cam actuator as claimed in claim 2, wherein said epicyclic reducer includes two opposed idle gears, said cover plate carrying supporting pins for said idle gears.

4. The cam actuator as claimed in claim 3, wherein said pivot internally presents the following turned and concentric seats:
   a centring seat for said shaft of said motor
   a centring seat for said fixed internal-toothing ring gear of said reducer
   a centring seat for said cover plate of said reducer.

5. The cam actuator as claimed in claim 4, wherein said pivot is defined by an external turned centring surface that cooperates with said cam and is concentric with said centring seats.

6. The cam actuator as claimed in claim 5, wherein said pivot internally defines a lower and an upper housing compartments separated by a transversal partition, wherein said transversal partition is provided with a hole for the passage of said shaft of said motor, the latter being housed in said lower compartment that is closed by a cover, and wherein said upper compartment houses said epicyclic reducer and is closed by said cover plate.

7. The cam actuator as claimed in claim 6, further comprising a crank mechanism cooperating with said eccentric cam for transforming a circular motion into a reciprocating motion.

8. The cam actuator as claimed in claim 7, wherein said cam pivots between one idle position and one working position and is driven in either direction by said motor.

9. The cam actuator as claimed in claim 7, further comprising a spring cooperating with said cam and wherein said cam pivots between one idle position and one working position, said idle position being reached by effect of the drive of the motor and said working position being maintained by effect of a return force exerted on the cam by said spring.

10. The cam actuator as claimed in claim 9, further comprising a circular boot supporting said pivot and a counter-boot having a slot and connected with said circular boot, wherein said cam defines a rim surrounded by said counter-boot and having an enlarged edge carrying a tooth, and in comprising a strap housed inside said counter-boot and having an hooked end abutting on said tooth, and another end provided with a handle, which is installed outside said slot.

11. The cam actuator as claimed in claim 10, wherein said strap carries a hole for inserting a lock pin to be inserted in another hole made in the counter-boot.

12. The cam actuator as claimed in claim 10, wherein said strap carries a hole for inserting a lock pin which is rigidly connected to said counter-boot.

* * * * *